United States Patent
Ciarniello

(10) Patent No.: US 12,015,831 B2
(45) Date of Patent: Jun. 18, 2024

(54) MULTIMEDIA CONTENT SECURE ACCESS

(71) Applicant: Telecom Italia S.p.A., Milan (IT)

(72) Inventor: Alberto Ciarniello, Rome (IT)

(73) Assignee: Telecom Italia S.p.A., Milan (IT)

( * ) Notice: Subject to any disclaimer, the term of this patent is extended or adjusted under 35 U.S.C. 154(b) by 103 days.

(21) Appl. No.: 17/770,895

(22) PCT Filed: Oct. 21, 2020

(86) PCT No.: PCT/EP2020/079553
§ 371 (c)(1),
(2) Date: Apr. 21, 2022

(87) PCT Pub. No.: WO2021/078763
PCT Pub. Date: Apr. 29, 2021

(65) Prior Publication Data
US 2022/0385987 A1 Dec. 1, 2022

(30) Foreign Application Priority Data
Oct. 23, 2019 (IT) ........................ 102019000019655

(51) Int. Cl.
*H04N 21/6334* (2011.01)
*G06F 21/10* (2013.01)

(52) U.S. Cl.
CPC ... *H04N 21/63345* (2013.01); *G06F 21/1014* (2023.08)

(58) Field of Classification Search
CPC ....... H04N 21/63345; H04N 21/25841; H04N 21/25875; H04N 21/4104;
(Continued)

(56) References Cited

U.S. PATENT DOCUMENTS 6,055,314 A 4/2000 Spies et al.
7,620,814 B2 11/2009 Ondet et al.
(Continued)

FOREIGN PATENT DOCUMENTS

WO 2005/036854 A1 4/2005
WO 2005/051021 A1 6/2005

OTHER PUBLICATIONS

Dec. 2, 2020—(WO) International Search Report—App PCT/EP2020/079553.
(Continued)

*Primary Examiner* — Mohammad W Reza
(74) *Attorney, Agent, or Firm* — Banner & Witcoff, Ltd.

(57) ABSTRACT

A method is disclosed for providing secure access to multimedia content to a user of a content service at a first user device configured to enable the user to consume the multimedia content. The method comprises: providing, from a second user device, a user identifier to a service provider of the content service, the second user device being provided with a subscriber identity module enabling the second user device to connect to a cellular communication network, the user identifier comprising an identifier of the subscriber identity module; at the second user device, receiving an access key from the service provider, through the cellular communication network, the access key being associated with the user identifier; providing the access key from the second user device to the first user device through a short-range connection, and at the first user device, using the access key to access the multimedia content.

18 Claims, 3 Drawing Sheets

(58) Field of Classification Search
CPC ......... H04N 21/43637; H04N 21/4623; H04N 21/6582; G06F 21/1014; G06F 21/35; H04L 9/0897; H04L 2209/603
See application file for complete search history.

(56) References Cited

U.S. PATENT DOCUMENTS

| 2006/0189319 | A1  | 8/2006  | Houldsworth et al. | |
|---|---|---|---|---|
| 2008/0118061 | A1  | 5/2008  | Yang et al. | |
| 2012/0246480 | A1* | 9/2012  | Selander | H04L 9/0844 |
| | | | | 713/168 |
| 2013/0340059 | A1* | 12/2013 | Christopher | H04W 8/183 |
| | | | | 726/7 |
| 2018/0083961 | A1* | 3/2018  | Lewis | G06F 21/44 |
| 2021/0036859 | A1* | 2/2021  | Sukhomlinov | H04L 9/3273 |

OTHER PUBLICATIONS

D. Diaz-Sanchez, A. Marin, F. Almenarez, A. Cortes and I. Telematica, "DVB-H Key Management System for UMTS Capable Devices," 2008 Digest of Technical Papers—International Conference on Consumer Electronics, 2008, pp. 1-2, doi: 10.1109/ICCE.2008. 4588098.

\* cited by examiner

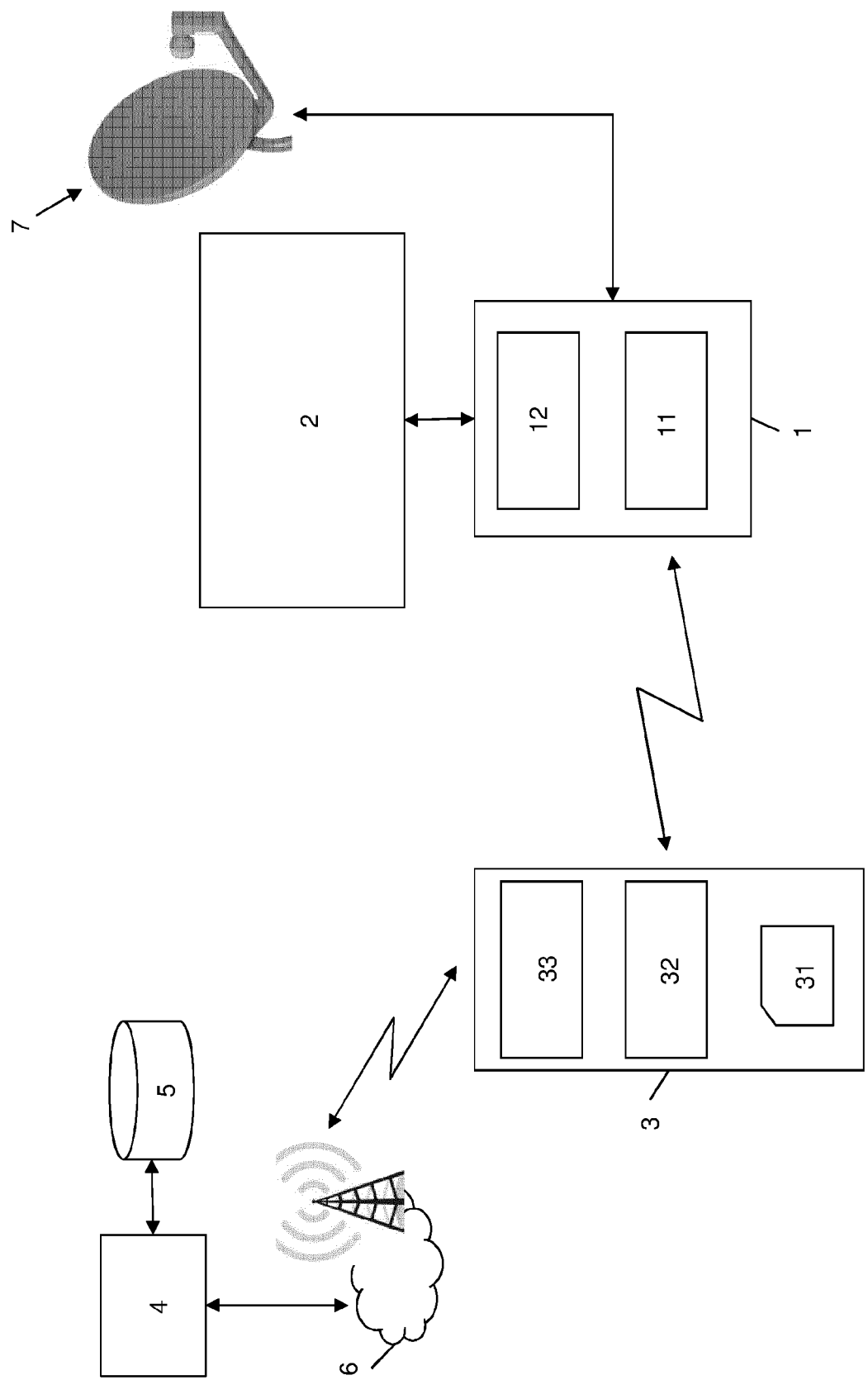

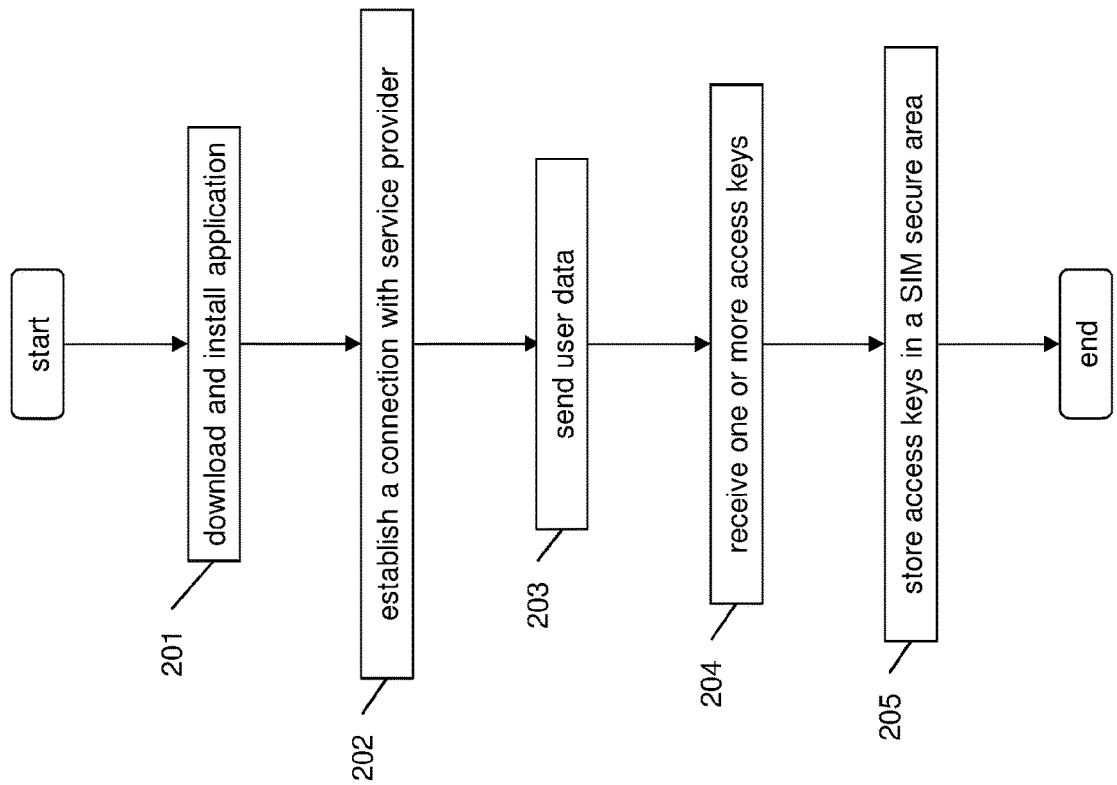

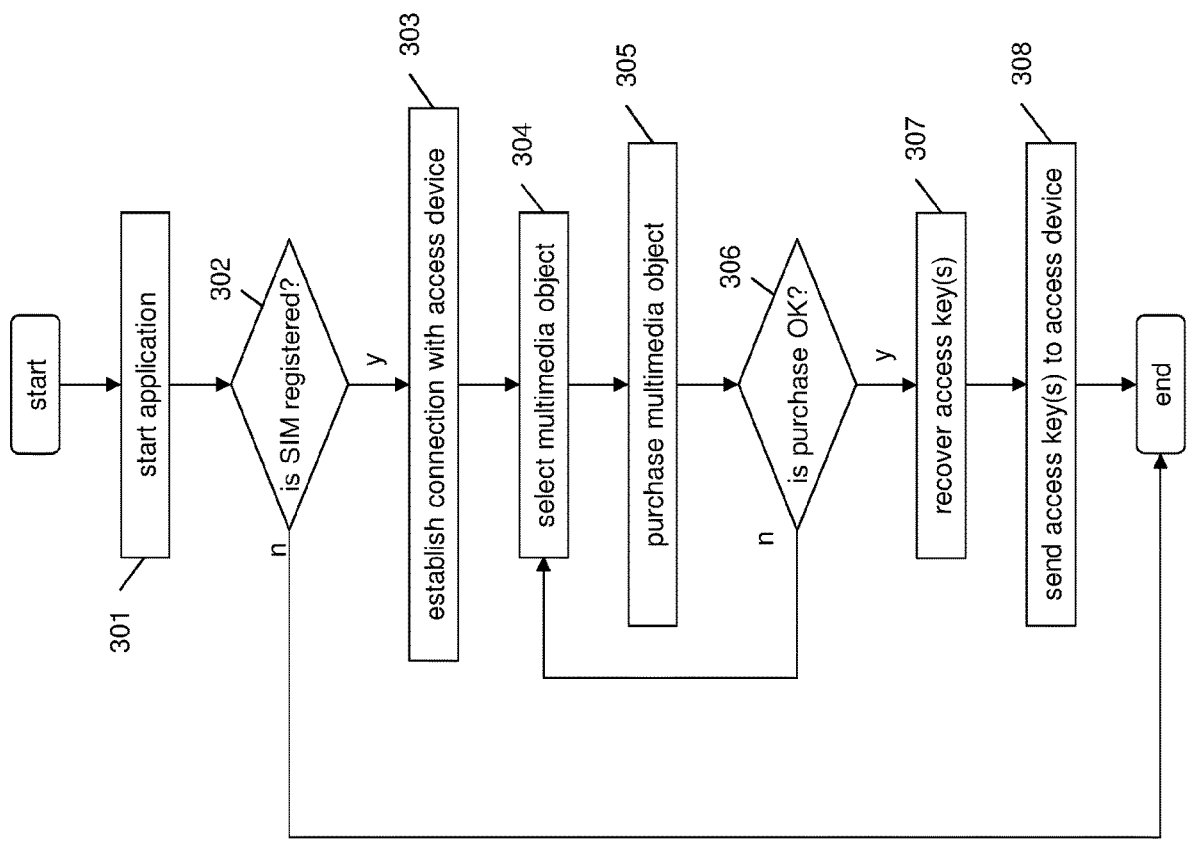

MULTIMEDIA CONTENT SECURE ACCESS

TECHNICAL FIELD

The present invention relates to the field of telecommunications. In particular, the present invention relates to a method for providing secure access to a multimedia content to a user of a content service (i.e. a service providing access to multimedia contents).

BACKGROUND ART

The mass diffusion of content services for user entertainment is nowadays made possible by the growing development of, on the one side, digital broadcast distribution systems such as satellite systems (e.g. based on Digital Video Broadcasting—Satellite or DVB-S standard), digital terrestrial systems (e.g. based on Digital Video Broadcasting—Terrestrial or DVB-T standard), radio systems (e.g. based on the Digital Audio Broadcasting standard also known as DAB/DAB+), and, on the other side, digital unicast or multicast distribution systems based on broadband networks (the so-called "Over-The-Top" or OTT systems).

Within the context recalled above, the problem of an effective and efficient protection of contents arises. Indeed, content protection is to be ensured to guarantee the correct distribution of contents according to the rights associated therewith, and to regulate access by users who are entitled to it, for example following the purchase or rent of a content. For example, protection can be configured to ensure that a particular movie purchased for rent for 48 hours can be seen by those who have actually rented it for such given period of time and not by others.

As a matter of fact, piracy has become a critical issue, as a large percentage of multimedia content users seem to be downloading or streaming illegal content. According to recent investigations (https://fapav.it/wp-content/uploads/2019/07/SINTESI-INDAGINE-2018_FAPAV-Ipsos.pdf) in Italy, 38% of Italian adults committed at least one act of piracy by illicitly consuming films, series or programs, often pirating more than one type of content. A world overview shows varied but significant trends (https://ustr.govisites/default/files/files/Press/Reports/2018%20Speci al %20301.pdf).

The protection systems adopted today for digital broadcast distribution systems typically rely on encryption of the digital signal carrying the multimedia contents. These systems are then generally based on smart cards with decryption capabilities, such smart cards being inserted in set-top boxes or television (TV) decoders or in appropriate slots made available in compatible television sets (namely, TV sets integrating the necessary capabilities for receiving and decoding the digital signal carrying the multimedia content provided through the digital broadcast distribution system), for example slots provided in a conditional access module (CAM) integrated in the TV set, implementing a conditional access system (CAS) standard. For unicast or multicast systems, protection systems are typically based on Digital Rights Management (DRM) technologies that are implemented as HW/SW modules and may be integrated within set-top boxes, especially in case of services based on audio/video streaming technologies over broadband networks.

U.S. Pat. No. 6,055,314 discloses a system and method for secure purchase and delivery of video content programs over various distribution media, including distribution networks and digital video disks, which includes an integrated circuit card (e.g., a smart card, PCMCIA card) which is configured to store decryption capabilities for related video programs. The decryption capabilities are initially kept in a secure store at a video merchant. When a purchaser orders a particular video program, the decryption capabilities for that program are downloaded to the IC card, either at the merchant premises or over a distribution network. The video content program is distributed in encrypted format via the distribution media to the purchaser. The IC card uses the decryption capabilities to at least partly decrypt the video content program without exposing the decryption capabilities.

WO 2005051021 describes a subscriber identity module (SIM) that facilitates subscriber identity information and subscriber video information. The SIM operates in accordance with a dual-purpose subscriber identity system (SIS) that includes a subscriber mobile identity component (SMIC) and a video security component (VSC) such that the cellular and video services can be authenticated.

In "DVB-H Key Management System for UMTS Capable Devices" by Daniel Díaz-Sánchez, Andrés Marín, Florina Alménarez, and Alberto Cortés, Ingeniería Telemática, Universidad Carlos III de Madrid, Avda. De la Universidad 30, 28911, Leganés, Madrid Spain, is described a system to enable pay-per-view services in mobile handhelds which takes benefits of both DVB-H and UMTS networks. DVB-H infrastructure provides a more appropriate content delivery framework that UMTS. Despite this fact, UMTS can pay an important role for charging and key distribution for pay-per-view applications by means of the provider SIM smart card.

U.S. Pat. No. 7,620,814 discloses a system that distributes content access data which provides rights management data indicating a right of a user to reproduce and/or copy the distributed content. The system includes an applications device including a trusted player for receiving, reproducing and/or copying the content, and a smart card access device for accessing a smart card, such as a Subscriber Identity Module (SIM), which is uniquely associated with the user. A trusted server communicates the content access data to the smart card via a communications network by encrypting the content access data using an encryption key pre-stored on the smart card and known to the trusted server. A facility is thus provided for cost effectively distributing content and managing rights in the content using security facilities inherent in the smart card.

SUMMARY OF THE INVENTION

The inventor noticed that the production, distribution, and management of smart cards as well as the secure management of the dedicated HW/SW modules that implement the DRM associated with smart cards (such as for example the CAM modules) involve significant costs and inefficiencies for service providers and users. Moreover, customers may experience some inconveniences in the use of smart cards as they shall use different smart cards on the same decoder (or compatible TV set) or sometimes different decoders depending on the services that they have purchased. As a matter of fact, today, smart cards are specific to individual services. In addition, by losing one or more of such smart cards, customers could lose the rights they have acquired. Provision of duplicate smart cards is costly and may not be even feasible in some cases such as when business models based on commercial prepaid cards are used and the service provider does not keep a detailed record of users of such prepaid cards.

Furthermore, the inventor noticed that protection of broadcast contents is also used for distributing free contents while controlling the territorial extent of the distribution. In such cases, cost efficiency is even more important as higher costs for the user may further hinder service adoption. For instance, a satellite-based system is by its nature efficient in covering very large areas. In this case, the protection of broadcast contents is needed since the covered areas may be larger than those in which the distribution should take place on the basis of the rights associated with the considered contents. As a specific example, a protection system can be adopted to ensure free distribution of TV programs within a given country only, in case the territorial rights associated with those TV programs are available for free only for that country. However, this type of content protection typically requires dedicated smart card implementations. An example is the "Tivùsat" consortium (tivusat.tv) providing a ubiquitous satellite-based free to air TV service in Italy, by essentially re-broadcasting a number of domestic TV channels in order to provide a ubiquitous free to air TV service filling possible gaps in digital terrestrial-based broadcasting services.

In the light of the above, the Applicant has tackled the problem of providing a method for providing secure access to a multimedia content to a user of a content service provided through either a digital broadcast distribution system or a digital unicast or multicast distribution system, which allows reducing costs while improving protection and location-related control of the multimedia content.

The problem above has been solved according to the present invention by a method for providing a secure access to a multimedia content which allows eliminating the need of smart cards and CAM modules when the content is distributed through a digital broadcast distribution system, and the need of a dedicated full set of HW/SW modules for DRM when the content is distributed through a digital unicast/multicast distribution system. According to the present invention, the problem above is solved by a method for providing a secure access to a multimedia content according to which a first user device suitable for the multimedia content consumption at the user's premises is connected to a second user device provided with a subscriber identity module (or SIM), which receives from the service provider access key(s) for enabling the first user device to access the multimedia content and sends the access key(s) to the first user device in order to access the multimedia content.

In the present description and in the claims, the expression "multimedia content" indicates digital data comprising one or more different types of data such as video, audio, image, text. A multimedia content may indicate either a streaming audio/video content such as a broadcast live television program or event, or an on-demand content such as a movie or a TV show or a bundle of episodes of a TV series or the like. Within the meaning of the present invention, the expression "multimedia content" will also relate to the contents transmitted over a television channels or a bundle of television channels. Furthermore, the expression "multimedia content" may also relate to an Internet web page or an interactive video game.

Television broadcast channels are typically distributed by television platforms that may be based on fixed or mobile broadband or broadcast wireless networks, such as digital terrestrial-based television platforms or satellite-based television platforms. In Italy for example, satellite-based television platforms, such as Sky™, and digital terrestrial-base television platforms, such as Mediaset Premium™, typically provide subscription-based services. These television platforms may provide both live television channels and events and video-on-demand (VOD) contents, and the user can select to purchase either single events, according to, for instance, pay-per-view services, or subscriptions to bundle of channels or VOD contents. Other services providing VOD contents, such as Now TV™, Netflix™, Amazon Prime Video™, DAZN™, Apple TV™ typically use either a subscription model that requires users to pay a daily, weekly, monthly, or yearly fee to access a set of contents, which may comprise, typically, movies, live sports and TV shows or series, or a pay-per-view model to access a single event.

In the present description and in the claims, the expression "multimedia objects" will encompass the entities obtainable (e.g., purchasable) by the user and providing the user with the rights to access the multimedia contents, which may be related to a single multimedia content, within the meaning given above, as well as to the service subscriptions that a user may acquire to access the multimedia contents.

In the present description and in the claims, the expression "smart card" indicates a physical electronic authorization device embedding an integrated circuit (IC), which typically allows to control access to the multimedia content. The smart card is typically issued to a user of a content service by the service provider, such as a TV broadcaster.

In the present description and in the claims, the expression "access a multimedia content" relates to operations enabling a user to enjoy the multimedia content by means of a user appliance. These operations comprise decrypting the digital signal carrying the multimedia content by means of the access key(s).

According to the present invention, the distribution of the access key(s) to the SIM may be performed in either a "caching mode" or an "on-demand mode". The caching mode provides for sending the access key(s) after an initial configuration procedure during which the user registers to the service before any obtaining/purchasing of multimedia objects, while the on-demand mode provides for sending the access key(s) to a registered SIM only upon obtaining/purchasing the multimedia object. In case the "caching mode" is applied, any unused access key is deleted permanently or invalidated when the user is no longer registered to the service. As it will be clearer from the detailed description herein below, the former mode is more suitable for purchasing pay-per-view live events and it can be implemented to more efficiently handle possible traffic peaks for example related to live events attracting a potential massive audience. In particular, the service provider may provide keys in "caching mode" so that they can cover live events with high expected demand. The "caching mode" and "on-demand mode" are not mutually exclusive and can be used concurrently by the service provider.

In the present description and in the claims, the expression "access device" relates to a device allowing the multimedia content consumption by the user. Within the meaning of the present invention, in particular, the access device is a device comprising hardware and software modules configured to receive, decode and decrypt the digital signal carrying the multimedia content.

The access device may also be configured to provide an output signal to an image display and sound reproduction appliance, such as a TV set, so that the digital signal is turned into the multimedia content in a form that can be displayed on a screen of the appliance. In this case, the access device may be implemented either in an apparatus separated from the TV set and connectable to it, such as a digital set-top box (STB) or TV decoder, or directly in the TV set incorporating the capabilities of receiving and decoding the digital signal carrying the multimedia content.

Alternatively, the access device may be implemented in a personal computer (PC) or laptop or tablet or the like, possibly incorporating (or being connectable to) a monitor and/or a loudspeaker allowing the user to enjoy the multimedia content.

According to a first aspect, the present invention provides a method for providing secure access to a multimedia content to a user of a content service at a first user device configured to enable the user to enjoy the multimedia content, the method comprising:

a) providing, from a second user device of the user, a user identifier to a provider of the content service, the second user device being provided with a subscriber identity module enabling the second user device to connect to a cellular communication network, the user identifier comprising an identifier of the subscriber identity module;
  b) at the second user device, receiving an access key from the service provider, through the cellular communication network, the access key being associated with the user identifier;
  c) providing the access key from the second user device to the first user device through a short-range connection; and
  d) at the first user device, using the access key to access the multimedia content.

The short-range connection can be, e.g., a wireless connection or a cable connection.

Preferably, the identifier of the subscriber identity module is the MSISDN or the IMSI.

Preferably, the method further comprises storing the user identifier in a database of the service provider to register the subscriber identity module to the content service.

Preferably, the method further comprises, after step b), storing the access key in a secure memory area of the subscriber identity module.

Preferably, the secure memory area is a secure element embedded in the subscriber identity module.

According to some embodiments of the present invention, steps a) and b) are performed before obtaining/purchasing, from the service provider, a multimedia object providing the user with the rights to access the multimedia content.

According to other embodiments of the present invention, steps a) and b) are performed upon obtaining/purchasing a multimedia object providing the user with the rights to access the multimedia content.

Preferably, the method further comprises, before step c), providing from the second user device to the service provider localization data indicating a current position of the second device.

Preferably, step c) comprises sending a confirmation to the service provider indicating that the access key is being used in association with the multimedia content.

Preferably, the method further comprises, at the service provider:

(i) checking whether the user identifier is stored in the database as associated with a registered subscriber identity module; and
  (ii) in case check (i) is positive, checking whether the multimedia content is subjected to territorial restrictions indicating that the multimedia content is available only in a given area, and, in the affirmative, checking whether the second user device is currently inside the given area on the basis of the localization data, and wherein performing step c) is subject to a positive outcome of check (i) and/or (ii).

Preferably, the short-range wireless connection is a protected short-range wireless connection. More preferably, the protected wireless connection is a wi-fi protected access connection or a Bluetooth connection with encrypted communication.

According to a second aspect, the present invention provides a user device comprising a subscriber identity module enabling the user device to connect to a cellular communication network, the user device being configured to:

provide a user identifier to a provider of the content service, the user identifier comprising an identifier of the subscriber identity module;
  receive an access key from the service provider through the cellular communication network, the access key being associated with the user identifier; and
  through a short-range connection, provide the access key to a further user device configured to enable the user to enjoy a multimedia content.

According to a third aspect, the present invention provides an apparatus for providing secure access to a multimedia content to a user of a content service, the apparatus comprising a first user device configured to enable the user to enjoy the multimedia content and a second user device configured to host a subscriber identity module, the second user device being further configured to:

provide a user identifier to a provider of the content service, the user identifier comprising an identifier of the subscriber identity module;
  receive an access key from the service provider through the cellular communication network, the access key being associated with the user identifier; and
  provide the access key to the first user device, wherein the first user device is configured to use the access key to access the multimedia content.

According to a fourth aspect, the present invention provides a computer program product loadable in the memory of an apparatus and including software code portions for performing the steps of the method as set forth above, when the product is run on said apparatus.

BRIEF DESCRIPTION OF THE DRAWINGS

The present invention will become clearer from the following detailed description, given by way of example and not of limitation, to be read with reference to the accompanying drawings, wherein:

FIG. 1 is a scheme of an exemplary system suitable for implementing the method according to the present invention;

FIG. 2 is a flowchart illustrating steps of the method according to the present invention, during a configuration procedure; and FIG. 3 is a flowchart illustrating further steps of the method according to the present invention.

DETAILED DESCRIPTION OF PREFERRED EMBODIMENTS OF THE INVENTION

The skilled person will appreciate that the method described herein below may be applied for accessing either a multimedia content distributed by a digital broadcast distribution system or a multimedia content distributed by a digital unicast or multicast distribution system via a broadband network. However, for sake of non limiting example, the following detailed description will mainly refer to multimedia contents distributed by digital broadcast distribution systems.

FIG. 1 schematically illustrates a system comprising a group of devices used for accessing a multimedia content distributed by a digital broadcast distribution system according to the method of the present invention. The scenario illustrated in FIG. 1 is an exemplary scenario wherein the digital broadcast distribution system is a satellite system.

The multimedia content is made available to the user by a content service managed by a service provider, such as an entertainment video service. For instance, the multimedia content may be a TV show broadcast over a television channel or a live sport event broadcast through a pay-per-view service. Typically, the multimedia content is secured by the service provider prior to distribution by using a given encryption technique.

According to an embodiment of the present invention, a user of a content service is provided with a first user device and a second user device connectable to one another. In particular, the first user device is an access device 1 as defined above. The access device 1 may be implemented in a set-top box or a TV decoder connected to a TV set. Alternatively, the access device 1 may be incorporated in the TV set (e.g. a so called smart TV). In the exemplary scheme of FIG. 1, the access device 1 is a stand-alone device connected to a TV set 2.

The second user device is a cellular device 3 comprising a communication module suitable to connect the second user device to a cellular communication network. The cellular device 3 may be, for instance, a smartphone, tablet, PC, smartwatch, or the like. The communication module of the cellular device 3 is preferably configured to host a subscriber identity module (or SIM) 31 storing at least one SIM identifier such as the telephone number (namely, the MSISDN) or the IMSI. The subscriber identity module may be implemented as a stand-alone SIM card to be inserted in the cellular device or as an embedded SIM (eSIM).

As known, the SIM enables the communication module of the cellular device 3 to connect to a cellular communication network and send/receive data through the network. The cellular communication network is, for instance, a 5G or a Long Term Evolution (LTE) cellular communication network. It is schematically represented in FIG. 1 with a base station and indicated with reference number 6.

Preferably, the cellular device 3 is provided with a short range interface to securely connect to the access device 1. In the rest of the description it will be assumed that the short range interface is a wireless interface 32, although other types of interfaces are possible, e.g., a cable interface. The wireless interface 32 is preferably configured to connect the cellular device to Wi-Fi networks. A Wi-Fi network may comprise, as known, a wireless PDN—Packet Data Network, such as for example WPAN, WLAN, WMAN, WWAN—Wireless Personal, Local, Metropolitan, and Wide Area Network, respectively.

The cellular device 3 is preferably configured to connect to a service management system of the service provider to receive data enabling the user to enjoy the multimedia content, as it will be described herein after. The service management system of the service provider preferably comprises an access management unit, which is schematically indicated with reference number 4 in FIG. 1. The access management unit 4 of the service provider may be a remote server and it preferably cooperates with a database 5 to store data identifying the users of the content service. The connection between the cellular device 3 and the service management system may be established through the cellular communication network 6, as schematically represented in FIG. 1, or, for instance, through a broadband network connected via Wi-Fi.

The wireless interface 32 of the cellular device 3 is also configured to implement a short-range wireless connection between the cellular device 3 and the access device 1, as it will be described herein after. In the following description and in the claims, the expression "short range wireless connection" will indicate a wireless connection allowing to reach a communication distance ranging between several meters and several tens of meters. The short-range wireless connection may be a Wi-Fi connection, a Bluetooth connection or another short range connection possibly implemented in the cellular device 3, such as a short range connection based on the ANT+ technology. Preferably, the short-range wireless connection is a protected wireless connection, for instance a Wi-Fi Protected Access (WPA) connection or a Bluetooth connection where an encrypted communication is established between the cellular device 3 and the access device 1.

The cellular device 3 is provided with other known hardware components, such as a processor and a memory, which will not be further described herein after. In particular, the cellular device 3 may be provided with components allowing the acquisition of biometric data of the user, such as a camera and a fingerprint reader, that can be used for implementing security functions. Moreover, the cellular device 3 is preferably provided with a module for the device remote localization, such as for instance a GPS (Global Positioning System) module.

The cellular device 3 is preferably configured to execute an application software module 33 (simply, application) associated with the content service. The application 33 can be made available to users by the service provider or by the device manufacturer in agreement with the service provider. Multiple versions of application 33 can co-exist on the same device 3 thus allowing support of multiple services from different service providers to the same user. The application 33 preferably comprises a graphical user interface (GUI) through which the user of the content service may interact with the application 33 and in particular access a list of purchasable multimedia objects. The skilled person will appreciate that the operation of browsing multimedia objects can also be performed via the access device 1, e.g. on the screen of the TV set and that selected items may be provided to the cellular device 3 by establishing an appropriate connection between the access device 1 and the cellular device 3 via the wireless interface 32.

As anticipated above, a multimedia object purchasable by the user may correspond to a multimedia content that may be related to, for instance, a single event (e.g. a live football game, a TV show) or a bundle of one or more events or one or more TV channels. The list of purchasable multimedia objects may also include a set of purchasable service subscriptions. Examples of possible service subscriptions are a weekly subscription, a monthly subscription, a yearly subscription or an event-based subscription. The list of purchasable service subscriptions may also allow to purchase a single content according to a pay-per-view model. Each subscription provides the user with rights to access given multimedia contents for a predetermined period of time or to access a predetermined list of events. In particular, for instance, the user may subscribe to access a given TV channel, or a bundle of TV channels or a set of particular events such as a series of football games, etc.

Each multimedia object (i.e. each related multimedia content or service subscription) comprised in the list available to the user may be associated with territorial restrictions. For instance, a given event such as a football game may be made available by the service provider only to users of a given country because the rights associated with the event are available free of charge for the service provider only within that country.

The application 33 preferably provides the user with the following capabilities:
- register to the content service; registering may include providing data and/or authorisation for the implementation of a purchasing method such as, preferably, an online payment;
- select and purchase a multimedia object from the list mentioned above;
- establish a connection between the cellular device 3 and the access device 1 via the wireless interface 32.

The application 33 is also configured to allow the user to perform an online payment for purchasing the multimedia content or service subscription. Methods for performing online payments are known and hence they will not be described herein after. The methods for performing online payments available to the user depend on the capabilities that are offered by the service provider in agreement with the cellular communication network operator. They may be presented to the user by the GUI of the application 33. The online payment may be performed, for instance, by using the so called carrier billing, which provides for charging the payment to the mobile phone service bill, or via a credit card. In this latter case, the user inputs the credit card information (holder, number, expiration date, CVV2 or other credit card check digits, etc.), which are then sent to a remote server hosting a web store of the service provider. Payment may also be made by storing the credit card information on a secure web server and using, for instance, intermediary payment systems such as the known PayPal™ system. Advantageously, the access to the online payment may be controlled by implementing one or more identity authentication measures that are typically available on a cellular device, such as a smartphone, to increase online payment security. These measures comprise, for instance, one or more of the following: SIM card number verification, password or PIN (personal identification number) authentication, biometric authentication (fingerprint, iris recognition, facial recognition), sign authentication.

The access device 1 is provided with an interface configured to implement the short-range connection with the cellular device 3, e.g., a wireless interface 11 configured to implement the short-range wireless connection with the cellular device 3, in particular with the wireless interface 32 of the cellular device 3.

Moreover, the access device 1 is preferably configured to execute an application software module 12 (simply, application) associated with the content service. Analogously to the application 33, also the application 12 can be made available by the service provider or by the device manufacturer in agreement with the service provider. The application 12 is preferably capable of establishing the secure connection between the cellular device 3 and the access device 1 via the wireless interface 11, and it is configured to manage the access keys, as it will be described herein after.

As mentioned above, the operation of browsing multimedia objects may be performed via the access device 1 as well as the operations of selecting and obtaining, e.g., purchasing, a multimedia content. These operations may be performed when a connection is established between the access device 1 and the cellular device 3. In particular, this step may be executed by establishing an appropriate application level communication between the application 12 running on the access device 1 and the application 33 running on the cellular device 3 via the wireless interfaces 11, 32.

The access device 1 comprises further known hardware and software components, such as, for instance, a processor and a memory, which will not be described herein after. Moreover, the access device 1 comprises a receiver configured to receive the digital broadcast signal distributed by the service provider. The receiver may be a satellite receiver for satellite-based broadcast distribution systems. In this case, for instance, the receiver is connected to an antenna 7, as schematically illustrated in FIG. 1. The hardware and software components of such receivers are known and will not be described herein after. Alternatively, or in addition to the broadcast receiver, the access device 1 may comprise a broadband connection capability to connect to online media services such as video streaming services.

The method according to embodiments of the present invention will be now described with reference to the flow charts of FIG. 2 and FIG. 3.

The flow chart of FIG. 2 illustrates a configuration procedure performed by the cellular device 3 according to an embodiment of the present invention.

According to this configuration procedure, a user interested in the considered content service (because, for instance, she/he is interested in watching a football game whose related multimedia content is distributed by the considered content service) registers to the service by means of her/his cellular device 3. In order to do so, according to an embodiment of the present invention, the user operates the cellular device 3 to download the application 33 from the service access management unit 4 of the service provider or from authorised digital application stores in which the application 33 has been made available by the service provider (step 201). The application 33 may also be made available to the user by the manufacturer of the cellular device 3.

Then, the application 33 is installed in the cellular device 3. Subsequently, according to the configuration procedure, the user starts the application 33. Alternatively, the application 33 may automatically start once installed in the cellular device 3. Once started, the application 33 operates the cellular device 3 to establish a connection with the service access management unit 4 of the service provider through the cellular communication network 6 (step 202) or via a WiFi network.

After installation, when the application is started, the user is preferably required to provide personal identification data and payment data. Moreover, the user may be required to provide a consent to personal data processing (such as according to the GDPR, General Data Protection Regulation, for example).

According to the present invention, the user is preferably associated with a user identifier or user ID. The user identifier preferably comprises an identifier of the SIM 31 of the user, e.g. the telephone number (namely, the MSISDN) or the IMSI.

When the connection between the cellular device 3 and the service access management unit 4 is established, the data provided by the user and the user identifier are preferably sent to the service access management unit 4 (step 203). Meanwhile, the user identifier is preferably authenticated.

In case the cellular device 3 and the service access management unit 4 are connected over the cellular communication network 6, a known authentication system (which can also be referred to as "mobile authentication") may be implemented, according to which the MSISDN (whose level of trust is guaranteed by the cellular communication network) can be transferred by the cellular communication network 6 to the service management system through suitable and secure techniques (for example via suitable APIs providing the service management system with the MSISDN corresponding to a specific IP address assigned by the cellular communication network to the cellular device). Alternatively, a one time password (OTP) authentication procedure may be implemented, which can be established between the cellular device 3 and the service access management unit 4. In case the cellular device 3 is connected to the service access management unit 4 over a Wi-Fi network, the user may be authenticated by means of, for instance, the method described in WO2014198745A1, or a one time password (OTP) authentication procedure.

The service access management unit 4 preferably stores the user identifier comprising the SIM identifier in the database 5. In particular, preferably, the service access management unit 4 stores the user identifier comprising the SIM identifier in the database 5 together with an association between the user identifier and the considered content service. In this way, the user, and, in particular, her/his SIM 31, is registered to the considered content service. A SIM whose identifier is stored in the database 5 during the configuration procedure will be referred to as "registered SIM".

The user may be also associated with a user account in turn associated with a set of user data. The user data may comprise the information that the user is required to provide upon starting the application 33 or that she/he may provide also at a later stage, this information comprising the user personal identification data, the user payment data in turn comprising, for instance, credit card information, and, optionally, user preferences (such as, for instance, a preferred mode of receiving communications from the service provider, e.g. by e-mail). The user data are preferably sent by the cellular device 3 to the service access management unit 4 and the user account is securely stored at the service access management unit 4 in the database 5.

Then, according to an embodiment of the present invention, the service access management unit 4 of the service provider preferably associates with the user identifier of the cellular device 3 one or more access keys to be used to access the multimedia contents associated with the multimedia objects purchasable by the user. In particular, the access keys are preferably decryption keys suitable to be used by the application 12 in the access device 1 to decrypt the multimedia contents.

According to this embodiment of the present invention, the service access management unit 4 of the service provider preferably sends the one or more access keys associated with the user identifier to the cellular device 3, through the cellular communication network 6. The one or more access keys may comprise access keys that can be used only once to access multimedia contents according to the pay per view model. This may be the case of a sport event such as a football game. For accessing the multimedia content related to this event, one access key is needed, which can be used only once. Moreover, the one or more access keys may comprise access keys that may be used repeatedly, for instance for a given period of time (e.g. one month) to access the multimedia contents. This applies in case the user is purchasing a service subscription allowing her/him to access, for a given period of time (namely, until expiration of the time of validity of the service subscription) multimedia contents provided by the service provider, such as, e.g., the contents distributed over a bundle of TV channels.

The one or more access keys are received by the cellular device 3 (step 204) and they are preferably stored in a secure memory area of the SIM 31 (step 205). The secure memory area of the SIM 31 is preferably a Secure Element (SE) embedded in the SIM 31, to which, as known, access is protected.

The distribution of the access keys can be based on known Over The Air (OTA) technologies and SIM application toolkit platforms, whose detailed description will be omitted. Together with the access keys the cellular device 3 is typically provisioned with a further software application for the management of the access keys, which is configured to grant permission to recover the access keys stored in the secure area of the SIM. It is to be noticed that the SIM provisioning can be performed by using provisioning systems and platforms made available by the network operator for the post-sale SIM provisioning. These systems typically use dedicated and secure data connections separate from the connection resources used by the application 33 to enable the user to select and purchase the desired multimedia objects.

At the end of the configuration procedure illustrated above, the service access management unit 4 may send to the cellular device 3, through the application 33 running on it, a message indicating that the one or more access keys have been successfully provisioned to the cellular device 3 and are readily available to be used.

The skilled person will appreciate that the configuration procedure described above, in particular step 205, is related to the caching mode of distributing the access key(s) as defined above. This mode is particularly advantageous in order to avoid excessive traffic peaks upon distribution of the access keys, especially in case of live events attracting a huge number of users, when the actual times of purchase are very close to the time at which the event starts, thus generating high demand peaks for access keys. Indeed, excessive traffic peaks may negatively affect the access keys distribution, possibly compromising the distribution of the access keys to all the users that actually purchased the related multimedia content. Moreover, by caching the keys, the service infrastructure costs can be highly reduced having regard to the number of served customers.

The flow chart of FIG. 3 illustrates the steps performed by the cellular device 3 to select and possibly obtain, e.g., purchase, a multimedia object, and make it available for the consumption of the related multimedia content(s) at the access device 1.

For sake of example, it will be assumed herein below that, according to the caching mode of access key(s) distribution, one or more access keys have been already provisioned to the cellular device 3 during a configuration procedure as described above.

When the user wishes to purchase and access a multimedia content, she/he preferably starts the application 33 on her/his cellular device 3 (step 301). When the application 33 is started on the cellular device 3, it preferably operates the cellular device 3 to establish a connection with the service management system. Then, it is preferably checked whether the SIM 31 currently associated with the cellular device 3 is the registered SIM (step 302).

In the negative, e.g. if the user has changed the SIM in the cellular device 3, the user must register the new SIM to the content service before being able to access a multimedia content by means of the cellular device 3. In any case, if the check at step 302 is negative the entire procedure is ended.

If the SIM 31 currently associated with the cellular device 3 is the registered SIM, the procedure may continue. In particular, preferably, the cellular device 3 via its wireless interface 32 establishes the short-range wireless connection with the access device 1 (step 303). As already mentioned above, the short-range wireless connection is preferably a protected wireless connection, such as WPA connection. Moreover, the user, through the GUI of the application 33, may access the list of purchasable multimedia objects and select one multimedia object (i.e. a related multimedia content or service subscription) to obtain/purchase (step 304).

Once the multimedia object has been selected, the cellular device 3, through the application 33, preferably receives from the service management system of the service provider an object identifier uniquely associated with the selected object. In case a service subscription is selected, the object identifier enables the access to the set of multimedia contents related to the service subscription.

Moreover, once the multimedia object has been selected, the user preferably operates the application 33 to purchase the selected multimedia object (305).

The step of obtaining/purchasing the multimedia content/service subscription preferably comprises establishing a connection with a service purchase management unit (not shown in the drawings) of the service management system of the service provider, which manages online payments and/or other entitlement data for the obtainment/purchase of multimedia objects by the users of the content service. The service purchase management unit may be a remote server cooperating with the database 5 which stores the users' data. The service purchase management unit preferably cooperates with the service access management unit 4 of the service provider. It may be co-located with the service access management unit 4 on a same remote server and possibly share resources such as the database 5. The service access management unit 4 and the service purchase management unit may also be implemented as separate modules in a same remote server.

The step of purchasing the multimedia object further comprises sending to the service purchase management unit a purchase request and a set of data comprising:
- identification data of the user comprising the user identifier;
- localization data of the user indicating a current position of the cellular device 3 (e.g. the GPS coordinates provided by the cellular device 3);
- payment data of the user, such as, e.g., credit card information, in case this information is not already stored in the user account.

The data above are preferably sent by the cellular device 3 to the purchase management unit via the GUI of the application 33.

When the cellular device 3 is connecting with the service purchase management unit of the service provider for sending the data listed above, the user identifier may be authenticated. In this way, data are secured. The user identifier authentication may be performed in the same way as already described above with reference to the configuration procedure.

According to a possible variant, localization data may be provided to the service purchase management unit by the network operator of the cellular communication network 6 and may comprise user positioning coordinates derived from network data including the cell in which the cellular device 3 is currently located. These data are more reliable than, e.g., the GPS coordinates provided by the cellular device 3 as they cannot be altered by any means by the cellular device 3.

The data listed above are then preferably used to perform, at step 305, a number of checks by the service purchase management unit of the service provider, before actually performing the purchase operation.

In particular, the service purchase management unit preferably checks whether the user is allowed to purchase the selected multimedia object. In particular, the service purchase management unit preferably checks whether the user identifier received from the cellular device 3 is stored in the database 5 as associated with a registered SIM. In the negative, the purchase request is denied, the procedure is stopped and a corresponding negative acknowledgement message is sent to the cellular device 3, which can be displayed on the cellular device 3 via the GUI of the application 33. In this case, the user may again visualize the list of available multimedia objects and select another item.

If the check confirms that the user identifier is stored in the database 5 as associated with a registered SIM, the procedure continues as follows.

Firstly, in case the user has selected a multimedia content and not a service subscription, the purchase management unit preferably checks whether the user has already obtained/purchased a service subscription allowing her/him to access the selected multimedia content. If the user has a service subscription allowing her/him to access the selected multimedia content, the related access keys may be recovered and used to access the multimedia content. Indeed, as it will be described herein after, according to embodiments of the present invention, the necessary access key(s) may have been already transferred to the access device 1 by the cellular device 3 since purchasing of the service subscription.

If the user has not already a service subscription allowing her/him to access the selected multimedia content (e.g. in case of a selection and purchase of a service subscription or of a multimedia content not already comprised in any service subscription purchased by the user), the purchase management unit preferably checks whether the multimedia object selected by the user is subject to territorial restrictions and, in the affirmative, preferably checks the localization data sent by the cellular device 3. If territorial restrictions apply and the multimedia object is actually available only in a given area, the purchase management unit checks whether the cellular device 3 is currently inside the given area on the basis of the localization data sent by the cellular device 3 via the application 33 and/or the localization data provided by the network operator of the cellular communication network 6. In the negative, the purchase request is denied, the procedure is stopped and a corresponding negative acknowledgement message is sent from the purchase management unit to the cellular device 3, which can be displayed on the cellular device 3 via the GUI of the application 33. In this case, the user may again visualize the list of available multimedia objects and select another item.

On the contrary, if territorial restrictions apply and the cellular device is currently inside the allowed area, the online authorization, e.g., online payment, may take place according to known procedures. Once the online authorization/payment has been performed with a positive outcome, the cellular device 3 preferably receives a positive acknowledgement message from the purchase management unit indicating the positive outcome of the authorization/payment procedure. A corresponding message may be displayed on the cellular device 3 via the GUI of the application 33.

It is to be noticed that the operation of obtainment/purchasing the multimedia object may be secured and confirmed by implementing one or more of the authentication measures available on the cellular device 3, e.g. by requiring the user to provide her/his fingerprint.

Step 306 illustrated in FIG. 3 indicates receiving at the cellular device 3 either the positive acknowledgement message or a negative acknowledgement message as described above.

In case of a positive outcome of the payment procedure (in which case, as described above, a positive acknowledgment message is received by the cellular device 3), the application 33 is preferably authorized to recover one or more access keys from the SIM secure area. The access keys(s) will be associated with the purchased multimedia object. The application 33 may be authorized through a communication between the application 33 and the further software application mentioned above, which is configured to manage the access key(s) and which has been provisioned to the cellular device 3 together with the access key(s).

At step 307, the application 33 preferably accesses the SIM secure area and recovers the one or more access keys, which are associated with the purchased multimedia object. At this point, the cellular device 3, via its wireless interface 32, preferably sends the object identifier and the associated access key(s) to the access device 1 (step 308), which receives the data via its respective wireless interface 11 over the short-range wireless communication that has been established between the two devices at step 303. At the same time, the cellular device 3 sends a confirmation to the service access management unit 4 indicating the access key(s) being used in association with the purchased multimedia object, so that the use of such access key(s) can be tracked by the service management system. Once the access device 1 has received the access key(s), the application 12 may use it to access the multimedia content(s) associated with the purchased multimedia object and make them available to the user.

In case the user selected a multimedia object related to a single multimedia content comprising a single live event such as a football game, the application 33 preferably recovers a specific access key from the SIM secure area, which the application 12 may use to access the multimedia content related to the single live event only. In particular, the access key is used to decrypt the digital signal carrying the selected multimedia content so as to enable the user to enjoy it, for instance by means of the TV set 2, as schematically shown in FIG. 1.

According to an embodiment of the present invention, in case the user selected a service subscription to be purchased, the application 33, upon purchase of the service subscription, preferably recovers one or more access keys from the SIM secure area, which are then sent to the access device 1 by the cellular device 3 via its wireless interface 32. The access device 1 may be able to store the access key(s) and use them to access the multimedia contents whose rights fall within the terms of the purchased service subscription. In this way, to access the multimedia contents related to the service subscription (e.g. the TV channels of a bundle of channels to which the user has subscribed for a month), the access device 1 may use the access key(s) that has/have been received upon purchase of the service subscription, without further interacting with the cellular device 3. Alternatively, the necessary access key(s) may be obtained by the access device 1 from the cellular device 3 only when the user operates the access device 1 to view a multimedia content whose rights fall within the terms of the purchased service subscription. In this case, the access device 1 does not store the access key(s). This advantageously helps preventing possible unauthorized accesses to the multimedia contents whose rights fall within the terms of the purchased service subscription, such as an access beyond allowed territorial boundaries. For instance, this would avoid provisioning the access device 1 with valid access keys in advance, so that if the user subsequently moves the access device 1 to a not allowed location (i.e. a location violating territorial rights associated with the purchased multimedia object), she/he cannot access the multimedia contents. This also helps preventing unauthorised key recovery from the access device 1.

Optionally, together with the access key(s), the cellular device 3 may be configured to send to the access device 1 other data such as localization data indicating a current position of the cellular device 3 provided by the cellular device 3 itself (e.g. the GPS coordinates of the cellular device). If territorial restrictions apply and the content is actually available only in a given area, the access device 1 may be configured to check whether the cellular device 3 is currently inside the area on the basis of the localization data available by means of the cellular device 3. Moreover, the access device 1 may be configured to, in case the cellular device 3 is not within the allowed area, block the access to the purchased multimedia content and possibly present an error message to the user.

The procedure described above with reference to steps 301-306 may be analogously applied when the on-demand mode for the access key(s) distribution is implemented. In this case, if the payment procedure has come to a positive outcome (step 306), the service access management unit 4 preferably associates with the user identifier one or more access keys to be used to access the multimedia object that has been purchased by the user, and sends the one or more access keys to the SIM in the cellular device 3 via the dedicated communication channel through the cellular communication network 6. Preferably, the application 33 is notified of the availability of the access key(s). Then, the application 33 preferably operates the cellular device 3 via its wireless interface 32 to send the access key(s) to the access device 1 via the wireless interface 11. Moreover, preferably, the cellular device 3 sends a confirmation to the service access management unit 4 indicating the access key(s) being used in association with the purchased multimedia object, so that the use of such access key(s) can be tracked by the service management system. The application 12 of the access device 1 may use the access key(s) to access the multimedia object and make available to the user the related multimedia content(s).

As mentioned above, during the configuration procedure or upon purchasing a selected multimedia object, one or more access keys are provisioned to the cellular device of the user after the SIM registration to the content service by means of an application installed on the cellular device of the user. According to a variant of the method described above, a user interested in the considered content service may register her/his SIM to the content service by accessing a web site possibly managed by the service provider, and providing data relating to the SIM (e.g. the phone number) and data relating to her/his access device by, for instance, filling out a form comprised in the web site. An authentication procedure is preferably set up, which may be based on a one-time password (OTP), by means of which the service provider checks whether the user is actually in possession of the SIM to which the access keys should be sent, and whether the user has correctly downloaded and installed the application associated with the content service.

Through the web site, the service provider may provide the user with information on how to configure the access device and with the possibility of purchasing multimedia contents and/or service subscriptions directly via the web site. Also in this case, the user preferably employs her/his cellular device, provided with the application associated with the content service, to send to the service access management unit of the service provider the user identifier, so that the service access management unit of the service provider may send to the SIM in the cellular device the access keys to be used to access the multimedia contents purchasable by the user.

According to another variant of the method described above, one or more access keys may be pre-stored in SIM cards before their placing on the market. In this way, the user is not required to register her/his SIM to the considered content service in order to get the access keys. This variant may be implemented in case an agreement is made between the service provider and the mobile network operator selling the SIM cards. For instance, a network operator may store in the SIM cards, before placing them in the market, one or more access keys to access the multimedia contents carried over a given bundle of television channels distributed by a given service provider. Such variant may also be effective to provide the users with service bundle offerings.

According to another embodiment of the present invention, the first user device and the second user device are not physically separated devices but their functionalities are incorporated in a same apparatus such as a set-top box. In this case, the two wireless interfaces 11, 32 are not necessary and a single application software module can be developed instead of the two application software modules 12, 33 described above.

For instance, a set-top box may incorporate both the modules configured to receive and decode the digital signal carrying the multimedia content and a communication module hosting a SIM card. In such cases, the SIM card may advantageously be a so called IoT SIM card, specifically designed for IoT (Internet of Things) applications. Usually, the IoT SIM cards are SIM cards providing data connection, specifically tailored to connect devices, but not voice connection capabilities. They are typically capable of enabling connection of the cellular device to a cellular communication network and may have longer validity time, with respect to a standard SIM card, or even "unlimited" validity. Alternatively, a smartphone or tablet—which may incorporate or may not incorporate a digital TV receiver—can implement the present invention to manage secure access to multimedia contents by combining application software modules similar to the application software modules 33 and 12 described above.

As already mentioned above, the method of the present invention may be conveniently applied to provide secure access also to a multimedia content distributed by digital unicast or multicast distribution systems via a broadband network. Typically, the multimedia content is distributed according to an adaptive bitrate streaming technology, such as for instance MPEG DASH (Dynamic Adaptive Streaming over HTTP), Microsoft Smooth Streaming, Apple HLS (HTTP Live Streaming), etc. Adaptive bitrate streaming technologies provide for dynamically modifying the video quality as a function of the available bandwidth over the data connection in near real time, which may be, for instance, an ADSL or fiber-based residential line that is shared among different devices (TV sets, PCs, surveillance devices, domotic devices). The access device, in this case, typically integrates an HW/SW system of content protection based on a DRM technology such as Microsoft PlayReady, Marlin, HLS Pantos encryption, which requires access keys or access keys and associated rules (typically referred to as "licenses") for decrypting the multimedia contents that are distributed and secured by the service provider.

Advantageously, the method according to the present invention provides secure access to multimedia contents and allows reducing costs while improving protection of the multimedia contents. Indeed, lower costs are achieved with respect to current systems thanks to:
- use of the SIM (or eSIM) already comprised in the cellular device of the user, which advantageously provides a secure connection to receive the access keys from the service provider and send them to the access device;
- use of SW modules or applications which are already available in the involved devices or which can be easily obtained from existing modules, or which can be easily implemented by means of available software development kits;
- reduced need to adapt the HW modules of the involved devices as no extra computing capabilities are required.

Improved protection is advantageously achievable thanks to:
- eliminating the need of smart cards, CAM modules and dedicated HW/SW modules for DRM;
- eliminating the risk of theft or loss of the smart card;
- eliminating the risk of illegal accesses based on modifications of the firmware of the smart card or CAM module;
- re-use of HW/SW modules available in the cellular device to obtain accurate positioning information usually employing multiple systems (e.g. GALILEO, GPS, GLONASS, BEIDOU, etc.).
- re-use of existing network-based or mixed network/WiFi/satellite-based functionalities to obtain mobile device positioning with the possibility to apply in a more strict way territorial restrictions thanks to the availability of localization data of the user cellular device;
- re-using identity authentication measures that are already available in the user cellular devices comprising for instance biometric authentication.

Finally, advantageously, both the device manufacturers and the service providers may benefit from the method of the present invention, in that:
- the manufacturers of TV sets, TV decoders, set-top boxes, etc. are provided with a method that may be applied to all types of devices and to all types of multimedia contents, either live TV contents or VOD contents;
- the method allows reusing components that are often already available in the TV sets, TV decoders and set-top boxes, such as the Wi-Fi modules;
- for the service providers, the method of the present invention represents a global e-commerce solution for the sale of services that can be distributed via a variety of broadcast and broadband networks, which is also adjustable on the basis of specific needs of each service;
- the service providers need not sell and distribute smart cards, which results in a great reduction of costs;
- the complexity of applications associated with the service provisioning is reduced by performing the e-commerce operations in the smartphone and using smartphone applications widely available to large amounts of potential customers with few versions, as compared to the greater fragmentation of applications present on TV decoders, smart TVs etc., which do not currently have prevailing standards and therefore lead to much higher development and software maintenance costs;

the access keys are distributed by using a secure provisioning which is available on all SIM-based cellular communication networks.

The invention claimed is:

1. A method for providing secure access to multimedia content to a user of a content service at a first user device configured to enable the user to consume said multimedia content, the method comprising steps of:
   a) allowing the user to select said multimedia content;
   b) after allowing the user to select said multimedia content, receiving, at a second user device of the user, an object identifier associated with said multimedia content;
   c) providing, from the second user device of the user, a user identifier to a service provider of said content service, said second user device being provided with a subscriber identity module configured to connect to a cellular communication network, said user identifier comprising an identifier of said subscriber identity module;
   d) at the second user device, receiving an access key from the service provider, through said cellular communication network, said access key being associated with said user identifier;
   e) providing, from said second user device and to the first user device through a short-range connection, said access key and said object identifier;
   f) sending, to the service provider, a confirmation indicating that the access key is being used in association with said multimedia content, which is identified by said object identifier; and
   g) at said first user device, using said access key to access said multimedia content.

2. The method according to claim 1, wherein said identifier of the subscriber identity module is an MSISDN or an IMSI.

3. The method according to claim 1, further comprises storing said user identifier in a database of the service provider to register said subscriber identity module to said content service.

4. The method according to claim 1, further comprising, after said step d), storing the access key in a secure memory area of said subscriber identity module.

5. The method according to claim 4, wherein said secure memory area is a secure element embedded in the subscriber identity module.

6. The method according to claim 1, wherein steps c) and d) are performed before obtaining, from the service provider, a multimedia object providing the user with rights to access the multimedia content.

7. The method according to claim 1, wherein steps c) and d) are performed upon obtaining a multimedia object providing the user with rights to access the multimedia content.

8. The method according to claim 1, further comprising, before said step e), providing, from the second user device to the service provider, localization data indicating a current position of the second user device.

9. The method according to claim 3, further comprising, at the service provider:
   (i) checking whether said user identifier is stored in said database as associated with a registered subscriber identity module; and
   (ii) in case check (i) is positive, checking whether said multimedia content is subjected to territorial restrictions indicating that said multimedia content is available only in a given area, and, in case said multimedia content is subjected to territorial restrictions, checking whether said second user device is currently inside said given area based on localization data indicating a current position of the second user device, and wherein performing said step ee) is based on a positive outcome of check (i) and/or check (ii).

10. The method according to claim 1, wherein said short-range connection is a short-range wireless connection.

11. The method according to claim 10, wherein said short-range wireless connection is a protected short-range wireless connection.

12. A non-transitory computer readable storage medium having software code portions stored thereon that, when executed by a computing device, perform the method of claim 1, when the software code portions are run on said computing device.

13. The method of claim 1, wherein the service provider distributes the access key to the second user device in one or more of: a caching mode or an on-demand mode.

14. The method of claim 13, wherein distributing the access key in the caching mode comprises providing the access key to the second user device after a registration procedure of the user, wherein the access key is deleted from the second user device upon expiration of the registration.

15. The method of claim 14, wherein the caching mode is selected based on a prediction of a traffic peak associated with a live event.

16. The method of claim 13, wherein distributing the access key in the on-demand mode comprises providing the access key to the second user device upon receiving a request to obtain a multimedia object.

17. A user device comprising a subscriber identity module enabling said user device to connect to a cellular communication network to obtain multimedia content, said user device being configured to:
   allow a user to select said multimedia content;
   after allowing the user to select said multimedia content, receive an object identifier associated with said multimedia content;
   provide a user identifier to a service provider of a content service, said user identifier comprising an identifier of said subscriber identity module;
   receive an access key from the service provider through said cellular communication network, said access key being associated with said user identifier;
   through a short-range connection, provide said access key and said object identifier to a further user device configured to enable the user to consume said multimedia content; and
   send, to the service provider, a confirmation indicating that the access key is being used in association with said multimedia content, which is identified by said object identifier.

18. An apparatus for providing secure access to multimedia content to a user of a content service, the apparatus comprising:
   a first user device configured to enable the user to consume the multimedia content, and
   a second user device configured to host a subscriber identity module, the second user device being further configured to:
     allow the user to select said multimedia content;
     after allowing the user to select said multimedia content, receive an object identifier associated with said multimedia content;

provide a user identifier to a service provider of the content service, the user identifier comprising an identifier of the subscriber identity module;

receive an access key from the service provider through a cellular communication network, the access key being associated with the user identifier;

provide the access key and said object identifier to the first user device; and send, to the service provider, a confirmation indicating that the access key is being used in association with said multimedia content, which is identified by said object identifier, wherein the first user device is configured to use the access key to access the multimedia content.

* * * * *